(12) United States Patent
Friesel et al.

(10) Patent No.: US 8,912,947 B1
(45) Date of Patent: Dec. 16, 2014

(54) SYSTEM AND METHOD FOR PARTITIONING ACQUISITION VOLUMES USING ROTATED COVARIANCE

(75) Inventors: Mark A. Friesel, Ewing, NJ (US); Juma M. Thorpe, Lumberton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 419 days.

(21) Appl. No.: 13/346,341

(22) Filed: Jan. 9, 2012

(51) Int. Cl.
   *G01S 13/72* (2006.01)
(52) U.S. Cl.
   CPC ........................... *G01S 13/72* (2013.01)
   USPC ............................................. 342/95; 342/175
(58) Field of Classification Search
   USPC .................................................... 342/95–96
   See application file for complete search history.

(56) References Cited

U.S. PATENT DOCUMENTS

| | | | |
|---|---|---|---|
| 4,467,447 A | 8/1984 | Takahashi et al. | |
| 5,890,012 A | 3/1999 | Poisner | |
| 7,184,036 B2 | 2/2007 | Dimsdale et al. | |
| 7,221,307 B1 | 5/2007 | Friesel | |
| 7,427,947 B1 | 9/2008 | Dark et al. | |
| 8,134,492 B1 * | 3/2012 | Friesel | 342/95 |
| 8,184,041 B1 * | 5/2012 | Friesel | 342/158 |
| 8,223,065 B1 * | 7/2012 | Friesel | 342/95 |
| 8,253,621 B1 * | 8/2012 | Friesel | 342/95 |
| 8,403,854 B2 * | 3/2013 | Sasaki | 600/443 |
| 8,427,364 B1 * | 4/2013 | Friesel | 342/95 |
| 2006/0202886 A1 | 9/2006 | Mahapatra et al. | |
| 2007/0018882 A1 | 1/2007 | Manoogian et al. | |
| 2007/0194983 A1 | 8/2007 | Stove | |
| 2008/0153414 A1 | 6/2008 | Ho et al. | |
| 2008/0210016 A1 | 9/2008 | Zwirn et al. | |
| 2013/0038327 A1 * | 2/2013 | Fautz | 324/309 |

* cited by examiner

*Primary Examiner* — Matthew M Barker
(74) *Attorney, Agent, or Firm* — Howard IP Law Group, PC (57) ABSTRACT

A method for searching a radar acquisition volume after rotating the radar acquisition volume is disclosed. The method may comprise identifying an acquisition face of the acquisition volume and partitioning the acquisition face so that each partitioned portion of the acquisition face can be searched within a predetermined time period. The partitioning step may comprise determining the maximum number of beams that can be searched in a predetermined period of time and iteratively repositioning an elevation line on the acquisition face to identify the highest elevation line for which the number of radar beams is less than or equal to the maximum number of beams. The partitioning step may also comprise defining a beam lattice for the acquisition face and determining a maximum elevation line based on the beam lattice. The area of the acquisition face bounded by the highest or maximum elevation line defines the partitioned portion.

20 Claims, 8 Drawing Sheets

FIG. 7

SYSTEM AND METHOD FOR PARTITIONING ACQUISITION VOLUMES USING ROTATED COVARIANCE

FIELD OF THE INVENTION

The invention relates to a system and method for searching acquisition volumes for radar systems in general, and more particularly to a system and method for searching acquisition volumes for beam-forming radar using a rotated covariance partitioning technique.

BACKGROUND OF THE INVENTION

Naval radar systems search space using a plurality of sequential directional beams which may be pointed in a given direction. In general, an acquisition face (volume) to be searched is defined, and the radar beam is directed so as to cover the entire search face. This type of searching is subject to time constraints, as the beam must dwell at a particular beam angle long enough for the transmitted radar signals or pulses to travel to the target and for the reflection to return to the radar.

When information becomes available from another source, such as a cooperating radar, about the possible presence of a target in a given direction or location, it may be desired to examine a volume about the nominal given direction in an attempt to acquire the target. This is referred to as a "cued" search. If the selected volume is too large, the search may time-out before completion. By contrast, if the selected volume is too small, the target might not be found.

In general, methods are known for searching a search volume about a given cued direction and with a given maximum search range. The search of a designated volume is, as noted, performed with sequentially generated radar beams. Such methods may involve acquiring the nominal track position and velocity (cue information) and time, as well as error information describing the uncertainty in the cue information. This error information may be presented together with the cue information. From the error information, the azimuth and elevation extent (the acquisition or search face) of the search volume about the cue direction is determined.

Partitioning methods may be used in an attempt to optimize the creation and search of cued acquisition volumes in such radar systems. An acquisition face describes the elevation and traverse (azimuth) extents about a central position, such that they enclose an area of estimated uncertainty. A radar beam may be described as a cone with a generating angle representing the beam width. The beam width is defined as the diameter of the beam. The intersection of a beam with the acquisition face is a circular region within which the beam energy is greater than or equal to the minimum drop-off energy. A beam forming radar may search the region by placing successive beams so as to form an overlapping pattern such that lines connecting adjacent beam centers describe a hexagonal tiling of the acquisition face. Each placed beam requires a time delay to complete its scan, consisting of the times for the beam to propagate over the selected range and back and the time to clear the emitter/receiver. The acquisition volume is time limited to a maximum search interval, i.e., for various reasons a search volume is considered valid by the radar only for a limited time, even though this time may be less than the time required to complete the search if the number of beams required is large and extended waveforms are used. Thus, methods have been sought to partition a search volume into searchable segments, one of which is sent to the radar and the remainder re-calculated for the subsequent search interval.

Methods have been described for reducing the number of radar beams required to exhaustively search an acquisition volume face during an attempt to acquire a target from a remote cue, wherein the projection of a covariance onto the traverse/elevation plane is rotated so that the principal axes of the projection align with the axes of the plane. The acquisition volume is then calculated in terms of traverse and elevation centers and extents and sent to the search radar along with the rotation angle. The search radar determines if a beam is within in the transmitted acquisition volume according to its criteria, and if it is, then the beam is rotated back through the angle of rotation to determine its final position. Such rotation methods, however, do not address partitioning. Thus, there remains a need for an improved partitioning methodology that insures that effective partitioning occurs within application constraints.

SUMMARY OF THE INVENTION

As noted, partitioning of an acquisition volume face can be performed when the number of search beams required to cover an acquisition volume face, multiplied by the dwell time per beam, exceeds the time allowed for the radar to complete its search of the acquisition volume. One methodology requires that, for this condition, the maximum elevation of the acquisition face is reduced until the volume is searchable. Subsequent partitions then may use the maximum elevation of the previous partition as the minimum elevation of the current acquisition face.

To optimize the creation and search of cued acquisition volumes for beam-forming radar, the partitioning methodology has been re-examined to insure that effective partitioning occurs within application constraints. As a result, methods are disclosed for rotating search volumes to reduce coverage requirements. In one embodiment, a method is disclosed for delimiting by true elevation, which approximately maximizes the partition size for a given maximum number of beams that can be placed within a search interval.

Although there are a number of potentially useful partitioning approaches depending upon search strategies, two basic forms of partitioning are disclosed. If the desire is to search such that the partitions are delimited in the direction of the semi-major axis of the projected covariance, it may be simplest to rotate so that this axis is oriented in the elevation direction of the viewplane. The only modification required, if the objective is to instead partition along the principal axis, is to rotate the smaller rather than the larger eigenvector of the projection into the traverse axis of the viewplane. Along with minimum to maximum elevation partitioning the method can be adapted to highest-to-lowest elevation, or center outward. This approach provides a variety of options in the selection of partitioning method to support various search objectives, for example to find minimum energy trajectories (center outward), elevated trajectories (highest-to-lowest), or depressed trajectories (lowest-to-highest). Alternatively, rotating the semi-minor axis of the covariance projection to the traverse axis of the viewplane may create an advantage by partitioning in the direction of the velocity vector, which is often aligned with the principal axis of the covariance.

Another form of partitioning is to use true elevation to delimit the partition size. This approach retains the underlying principle of current partitioning, but requires modification of current methods to adapt it to rotated covariance as will be discussed.

A method is disclosed for searching a radar acquisition volume after rotating the radar acquisition volume. The method may comprise: receiving a radar acquisition volume;

identifying an acquisition face of the acquisition volume; and partitioning the acquisition face so that each partitioned portion of the acquisition face can be searched within a predetermined time period. The rotating step may comprise rotating the acquisition face by a rotation angle so that an axis of the acquisition face is aligned with an axis of a viewplane. The partitioning step may comprise partitioning the rotated acquisition face into partitioned portions in which each partitioned portion is searchable within a predetermined time period. In another embodiment, the partitioning step may comprise determining the maximum number of beams that can be searched in a predetermined period of time; selecting an elevation line of the acquisition face; determining a first number of radar beams that can be placed under the elevation line; comparing the first number of radar beams to the maximum number of radar beams; iteratively repositioning the elevation line to identify the highest elevation line for which the first number of radar beams is less than or equal to a maximum number of beams allowed for the partition; wherein an area of the acquisition face bounded by the highest elevation line defines a partitioned portion. Partitioning may also be done by determining a maximum number of beams that can be searched in the predetermined time period; defining a bean lattice for the acquisition face; calculating beam center elevations for each beam in the beam lattice; and identifying, based on the beam center elevations, a maximum elevation line that uses a number of beams less than or equal to the maximum number of beams that can be searched in a predetermined time period, wherein an area of the acquisition face bounded by the maximum elevation line defines the partitioned portion. In another embodiment, partitioning may comprise determining a maximum and minimum elevation of the partitioned portion; determining an elevation and azimuth extent of the partitioned portion; and determining center coordinates of the partitioned portion. Calculating beam center elevations for each beam may comprise determining the distance of each beam center from a line sloped at the rotation angle. The partitioning method may further comprise identifying a next partitioned portion if the highest elevation line is below the maximum elevation of the rotated acquisition face or setting the highest elevation line of the partitioned portion as the minimum elevation line of the next partitioned portion.

A system is disclosed for searching a radar acquisition volume, comprising a command and decision unit for performing the steps of: identifying an acquisition face of the acquisition volume; rotating the acquisition face by a rotation angle; and partitioning the acquisition face. Rotating the acquisition face may comprise the command and decision unit rotating the acquisition face so that an axis of the acquisition face is aligned with an axis of a viewplane. The system may also include a communications unit for receiving the radar acquisition volume. The partitioning step may comprise the command and decision unit partitioning the rotated acquisition face into partitioned portions in which each partitioned portion is searchable within a predetermined time period. In another embodiment, the partitioning step may comprise the command and decision unit: determining the maximum number of beams that can be searched in a predetermined period of time; selecting an elevation line of the acquisition face; determining a first number of radar beams that can be placed under the elevation line; comparing the first number of radar beams to the maximum number of radar beams; iteratively repositioning the elevation line to identify the highest elevation line for which the first number of radar beams is less than or equal to a maximum number of beams allowed for the partition; wherein an area of the acquisition face bounded by the highest elevation line defines a partitioned portion. In a further embodiment, the partitioning step may also comprise the command and decision unit: determining a maximum number of beams that can be searched in the predetermined time period; defining a beam lattice for the acquisition face; calculating beam center elevations for each beam in the beam lattice; and identifying, based on the beam center elevations, a maximum elevation line that uses a number of beams less than or equal to the maximum number of beams that can be searched in a predetermined time period, wherein an area of the acquisition face bounded by the maximum elevation line defines the partitioned portion. The partitioning method may further comprise the command and decision unit identifying a next partitioned portion if the highest elevation line is below the maximum elevation of the rotated acquisition face or setting the highest elevation line of the partitioned portion as the minimum elevation line of the next partitioned portion.

BRIEF DESCRIPTION OF THE DRAWINGS

The details of the invention, both as to its structure and operation, may be obtained by a review of the accompanying drawings, in which like reference numerals refer to like parts, and in which.

DETAILED DESCRIPTION

Figure 1:
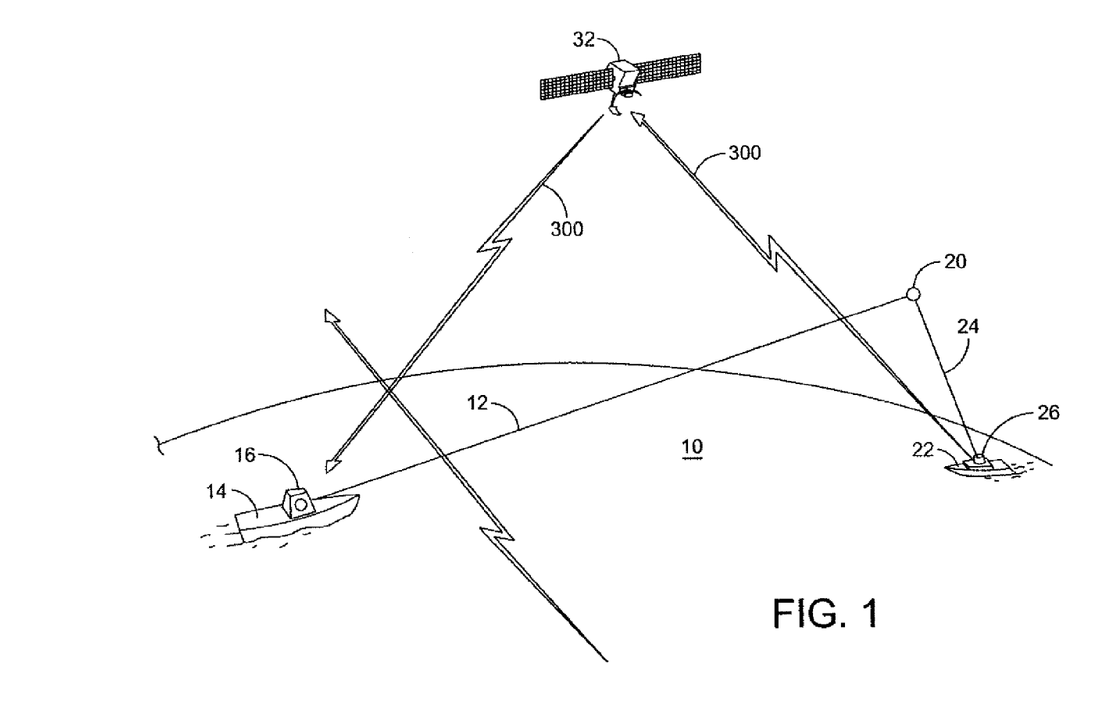
FIG. 1 is a representation of a radar-equipped ship receiving cued information relating to a target from a remotely located radar system.
Figure 2:
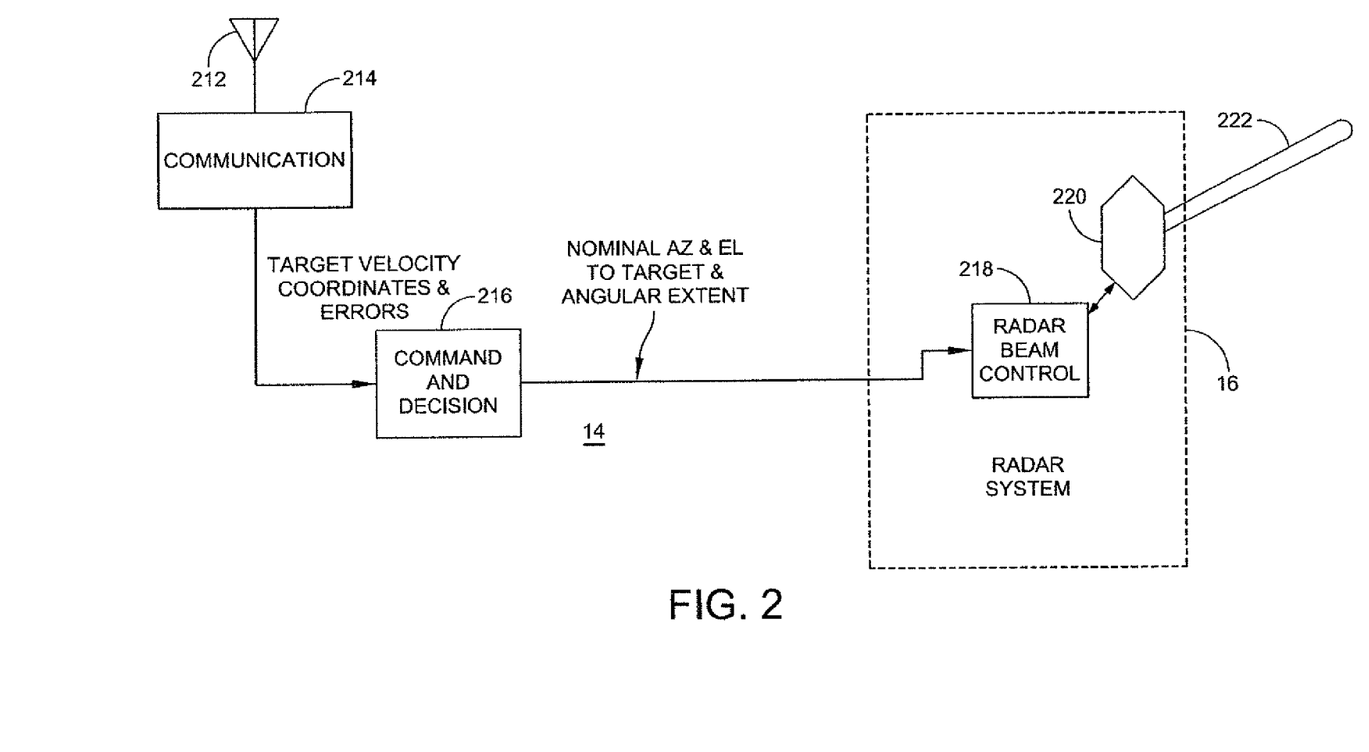
FIG. 2 is a block diagram illustrating various shipboard apparatus and functions relating to radar acquisition of the target of FIG. 1.

FIG. 1 shows a first ship 14 carrying a radar system 16, which includes a radar beam control unit 218 (FIG. 2). A target 20 is located at a distance 12 from the first ship 14, and is observed along a line-of-sight 24 by a radar system 26 carried on a second ship 22 which obtains information about the location of the target 20. Since the first ship 14 may not be aware of the presence of the target 20, the second ship 22 transmits information relating to the location of the target including coordinates of the target 20 and errors associated with the location, to the first ship 14 via a satellite 32 along communication paths 30U and 30D. The first ship 14 receives the communication from the second ship 22 via a communication antenna 212 (FIG. 2).

FIG. 2 is a block diagram of apparatus provided on the first ship, for performing various functions relating to radar acquisition of the target 20 of FIG. 1. The apparatus includes a communication unit 214 coupled to the earlier mentioned communications antenna 212 and communications unit 214, a command and decision (C&D) unit 216, and the earlier mentioned radar system 16. The radar system 16 includes a radar beam control unit 218 and a radar antenna 220. The radar beam control unit 218 causes the radar antenna 220 to sequentially generate or produce narrow or pencil-like radar search beams 222 (only one shown). The C&D unit 216 and the radar beam control unit 218 can be implemented in software executed by one or more CPUs, hardware, or any combination of software and hardware.

The C& D unit 216 of the radar system 16 digitally processes the target location information (cue coordinates) received from the second ship 22 by the communication unit 214, and from this location information determines a target azimuth and a target elevation angle relative to the first ship 14. Due to errors in determining the exact location of the target 20 (FIG. 1), the target 20 may not be found at the precise specified cue coordinates. In order to acquire and track the target 20 with the first ship's radar system 16, it is desirable to search a region or extent about the nominal target local coordinates. Therefore, the C&D unit 216 also determines azimuth and elevation extents of a target search or acquisition face 310 of a search or acquisition volume (FIG. 3A) required by the errors in target azimuth and elevation. The radar beam control unit 218 processes the information determined by the C&D unit 216 and causes the radar antenna 220 to sequentially produce the radar search beams 222 in a manner that searches the volume of space (acquisition volume) defined by the acquisition face and a desired range.

Figure 3A:
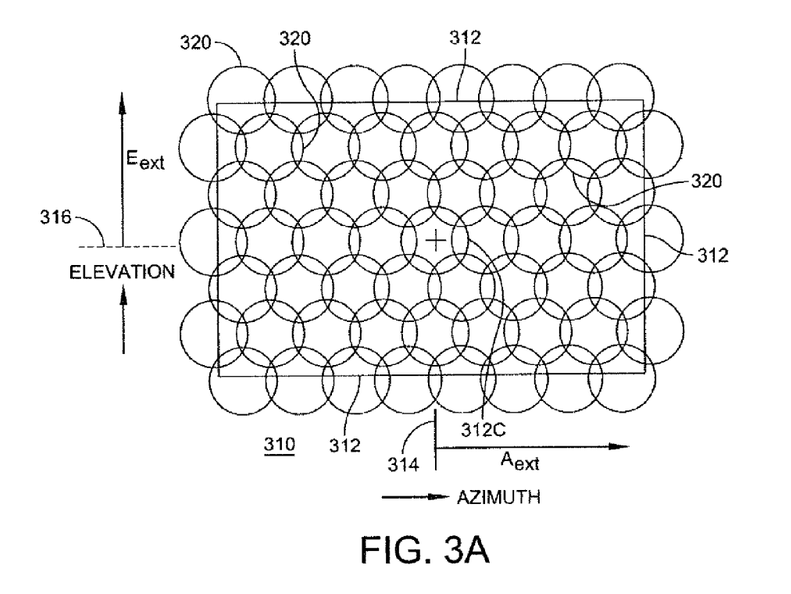
FIG. 3A is a view of an exemplary search or acquisition face.

FIG. 3A is a representation of the acquisition face 310 defined by the sequential radar beams 222 generated by the radar system 16 of FIG. 2. The azimuth and elevation directions are indicated by arrows. The nominal target azimuth and elevation, as specified by the target azimuth and elevation angle relative to the first ship 14 determined by the C&D unit 216. appears as a + symbol at the center of the acquisition face 310. A "cross-section" of each radar beam 222 is illustrated as a circle 320. The radar beam control unit 218 (FIG. 2) places an initial radar search beam represented by beam cross-section 312C at the center + of the acquisition face 310. Subsequent beams are placed to produce a regular pattern of partially overlapping beams that completely covers the acquisition face 320. Those skilled in the art will understand that the "magnitude" of the overlap depends upon the "beamwidth" of the beams, the relative placement of the beam centers by the radar system 16, and the attenuation or "signal" level at the overlap. The overlapping radar beams 222 provide coverage of a region defined by rectangular outline 312. The azimuth "extent" of the coverage region is defined by arrow $A_{ext}$, extending in the horizontal direction from vertical centerline 314 to rectangular outline 312. The elevation "extent" of the coverage region is defined by arrow $E_{ext}$, extending in the elevation or vertical direction from horizontal centerline 316 to the outline 312.

Figure 3B:
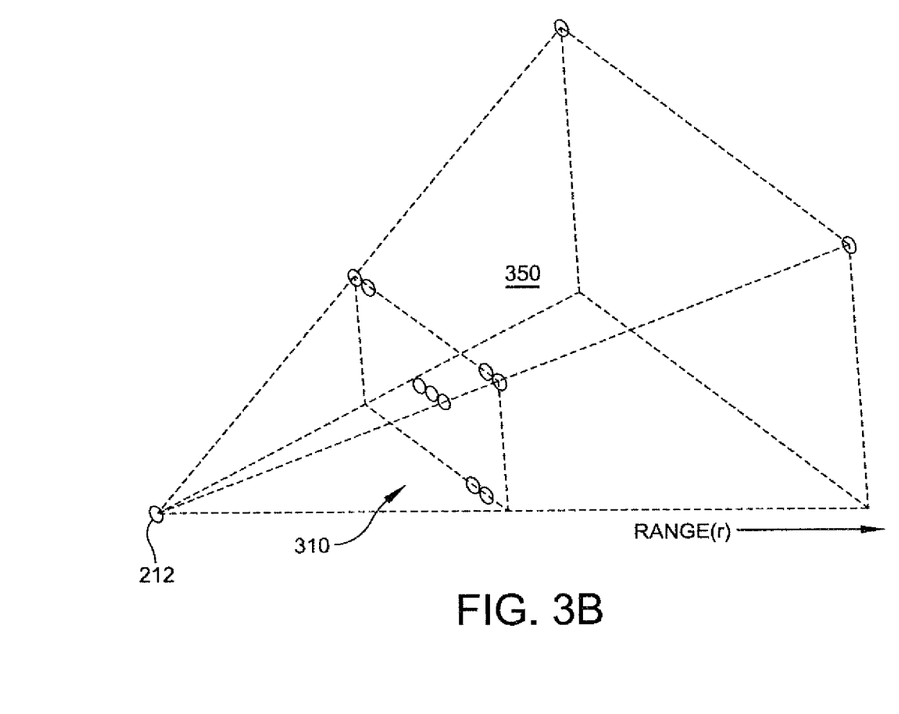
FIG. 3B is a representation of the relationship between an exemplary search or acquisition face and the associated search volume.

FIG. 3B illustrates the relationship of the acquisition face 310 to the overall search volume 350 associated with the acquisition face 310. As illustrated, the acquisition face 310 and range, r (which provides a third dimension), define the acquisition volume 350.

As previously noted, partitioning of an acquisition face of an acquisition volume can be performed when the number of search beams required to cover the acquisition face, multiplied by the dwell time per beam, exceeds the time allowed for the radar to complete its search of the acquisition volume. The first partition is defined so that a portion of the acquisition face can be searched within the allotted time period. Second and subsequent partitions are defined (and searched) extending from the maximum elevation of the previous partition to a new upper elevation.

To optimize the creation and search of cued acquisition volumes for beam-forming radar, the partitioning methodology should insure that effective partitioning occurs within application constraints. Methods are thus disclosed for rotating search volumes to reduce coverage requirements.

Acquisition Volume by Covariance Rotation:

At the time of search, the acquisition volume is centered on the propagated nominal target position, and the radar determines where to place a sequence of beams that enable it to search the entire volume in the allotted search time. As previously noted, the acquisition face identified in this manner may force the radar to use many more beams than are actually required to search the containment space defined by the covariance. For example, a highly elliptical, skewed covariance may cause more than double the number of required search beams to be scheduled. One solution is to rotate the projected covariance as previously described until its principle axes align with the traverse and vertical axes of the viewplane. The angle of rotation a required to achieve this alignment is sent to the search radar with the other search volume parameters, and the acquisition face is built to enclose only the rotated figure. To carry out the search, the radar can first determine if a beam is required to search this rotated acquisition face. If it is, the beam position is rotated back through the rotation angle, resulting in correct beam placement. Although the extents determined from the rotated covariance projection are different from extents of the unrotated (i.e., true) acquisition face, the extents from the rotated face can be used in the first instance to determine if beams should be placed.

Figure 4A:
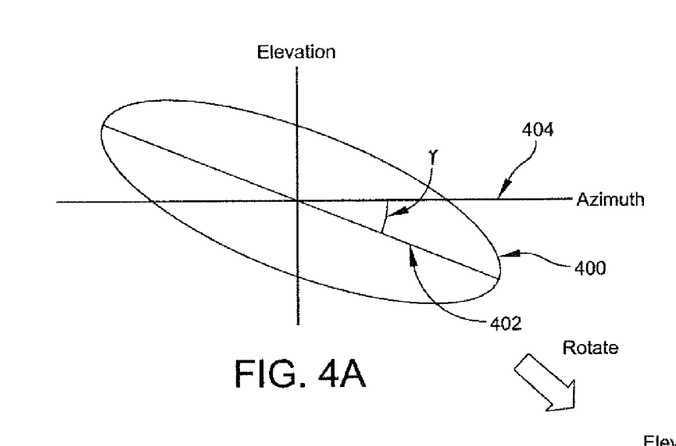
FIG. 4A is a schematic representation of a covariance ellipse rotated from the azimuth angle.
Figure 4B:
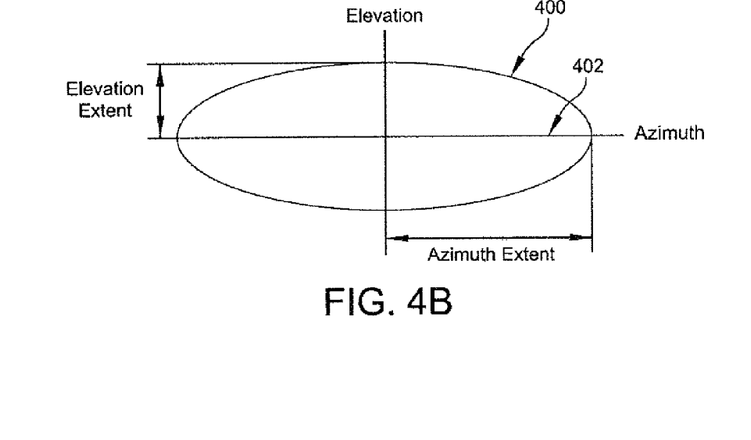
FIG. 4B is a schematic representation of the ellipse of FIG. 4A rotated so that its major axis is parallel with the azimuth axis.

The disclosed acquisition volume generation method uses a state vector and associated uncertainties, provided in the form of a position and velocity covariance, propagated to the time of search. To identify a suitable acquisition face, azimuth and elevation extents are found that enclose the covariance as seen by the search radar which, when coupled with corresponding range extents, orates the acquisition volume. An approximation of the radar view is obtained by projecting the covariance onto the plane normal to the radar range vector, i.e. the radar's viewplane, resulting in an ellipse. This is shown in FIGS. 4A and 4B. FIG. 4A is a representation of covariance information in the form of an ellipse 400. The major axis 402 of ellipse 400 is displaced by an angle α from the azimuth axis 404. This angular displacement results from the viewing angle of the ship receiving the cue relative to that of the ship providing the cue. If the azimuth and elevation extents are determined from the rotated covariance ellipse, the azimuth and elevation extents of the scan face may not cover the entire region in which the target may be found. In FIG. 4B, the covariance ellipse 400 has been rotated so that its major axis 402 is coincident with or parallel to the azimuth axis 404.

Figure 5:
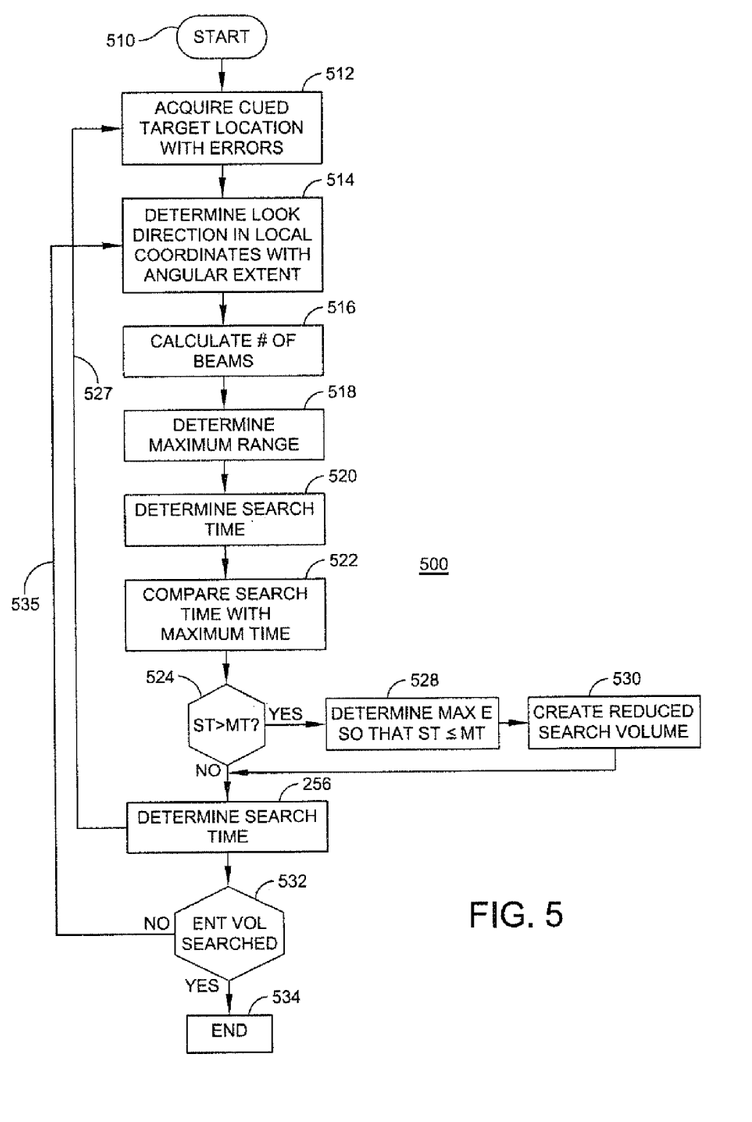
FIG. 5 is a flowchart illustrating steps according to an embodiment of the invention.

FIG. 5 is a flow chart illustrating steps according to an embodiment of the invention. The steps begin at block 510, and flow to block 512, which represents acquisition of cued target information, together with error information. This may be accomplished as described in relation to FIG. 1. From block 512 of FIG. 5, the logic flows to block 514, which represents determination from the cue information of the location of the target relative to ship 14, and calculation of the azimuth and elevation extent of the acquisition face. Block 516 represents the calculation of the number of beams required to fill the acquisition face. In addition to determining the number of beams in the search region, the time required to accomplish the search is also determined, taking into account the number of beams and the range. The range of the search volume is determined in block 518 in order to estimate search time per beam, as is known in the art. Command and decision unit 216 of FIG. 2 multiplies the range-dependent time with (or by) the number of beams, as suggested by block 520 of FIG. 5, and arrives at a scan or search time for the number of beams associated with the acquisition face.

Block 522 represents the comparison of the scan or search time with the maximum allowable time (i.e., the time at which the search aborts). A decision block 524 evaluates the comparison. The logic leaves decision block 524 by the NO output if the scan time is less than the maximum time. From the NO output of decision block 524, the logic flows to a block 526, representing the searching of the full volume.

If decision block 524 finds that the scan of the full extent will exceed the maximum time, the logic leaves the decision block by the YES output, and flows to a further block 528. Block 528 creates a modified (i.e., reduced) search volume, by calculating a maximum search elevation such that the search time of this modified volume will be less than or equal to the maximum search time. From block 528, the method flows to a block 530. The elevation center of the modified acquisition face is calculated as the unmodified minimum elevation plus $E_{ext\_new}$. The logic then leaves block 530 and enters block 526, where the modified acquisition volume is searched.

After an entire volume or reduced volume is searched in block 526, the logic then leaves block 526 and enters decision block 532, which evaluates whether the entire original acquisition volume has been searched, either in a single search that encompassed the entire volume or in a plurality of reduced volume searches that cumulatively encompassed the entire original volume. If decision block 532 finds that the entire volume has been searched, the logic leaves the decision block by the YES output and then the method flows to END block 534, ending the processing of the acquisition volume.

If decision block 532 finds that the entire volume has not been searched, the logic leaves the decision block by the NO output and flows by a path 535 to begin another iteration of searching the acquisition volume from block 514 through 532. These iterations continue until the entire original acquisition volume has been partitioned and searched.

An exemplary technique will now be described for partitioning in true covariance, for those instances where decision block 524 finds that the scan of the full extent will exceed the maximum time. Thus, an iterative technique is used to count beams under an elevation line, then repositions the line until the number of beams under the elevation line is less than or equal to the maximum number of beams allowed for the partition. The maximum true elevation of the partition is determined, and sent to the radar. The radar will place a beam if its center elevation plus beam width does not exceed the limiting elevation.

Estimating the Number of Beams Required to Search an Acquisition Face

As previously noted, Command and Decision creates search volume parameters, including azimuth and elevation centers $A_c$ and $E_c$ and extents $A_{ext}$ and $E_{ext}$, when certain conditions are met (such conditions determine whether a remote or lost track is eligible for search, and are not disclosed in detail herein). The number of beams required to search the volume is calculated using, for example, the following formula, in which B is the width of a radar search beam and γ is an angle obtained from geometric characteristics of the beam pattern covering an acquisition face. In one non-limiting exemplary embodiment, γ is π/6 (i.e., 30°). The beam pattern can be described both as columns and rows of beams, and by an hexagonal tiling of the search beams, as previously described. The azimuthal distance between the lines of centers of adjacent beam columns is given by:

$$\Delta A = \frac{B}{2} \cos \gamma$$

and the corresponding separation of adjacent beam rows is:

$$\Delta E = \frac{B}{2}(1 + \sin \gamma).$$

It has been shown that the minimum number of beams N required to cover the acquisition face can be calculated from two parameters m and n where beam rows contain alternately m and m+1 beams, and there are (2n+1) beam rows necessary and sufficient to cover the acquisition face. Then, an accurate determination of N is:

$$N = (2n+1)\left(m + \frac{1}{2}\right) + \frac{(-1)^{n+m}}{2},$$

Figure 6:
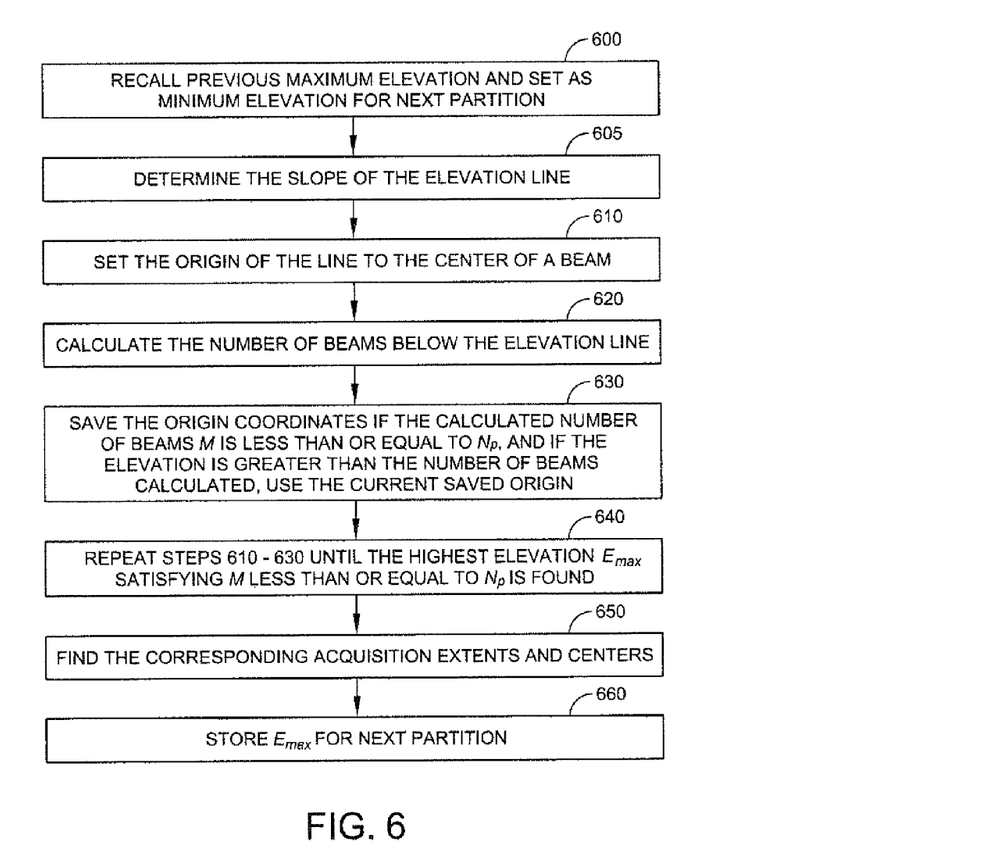
FIG. 6 is a flowchart illustrating steps for one method of partitioning the acquisition face of a search volume, at block 530 of FIG. 5.

Partitioning in True Elevation:

FIG. 6 is a flow chart of an exemplary method for partitioning an acquisition volume in true elevation. The method of FIG. 6 is representative of the type of processing performed in step 530 of the flowchart of FIG. 5. In step 600, the minimum elevation of the volume is replaced with the maximum elevation of the previously determined partition volume, so that the next partition starts where the previous partition ended. This step applies only where a previous partition has been calculated.

In step 605, the slope of the rotated elevation line is determined. This determination can be made by considering a covariance projected onto a viewplane and rotated through an angle α to align the principal axis of the projection, to the transverse axis of the viewplane (FIGS. 4A and 4B). The angle α lies on (π/2, −π/2), but only the non-positive rotation solutions, corresponding to the principal axis in the first quadrant such that α is positive in the direction of restoring the original orientation, will be described below. Positive (in the clockwise sense) rotations resulting in positive slope of the elevation line are obtained by appropriate symmetric processing. A line originally parallel to the horizon and rotated through a has slope β=tan(−α), where/is the slope of the horizon line in the rotated frame of the acquisition face. If β>0, β=−β.

In an embodiment, the origin of the elevation line is set to be the center of the beam in the Iowa right of the acquisition face at step 610. This process includes establishing the position or origin of the elevation line and calculating excluded beams. The solution used here is to evaluate test elevation lines, parallel to the rotated horizon and constrained to pass through a specified beam center. The means of selecting the beam center is not critical to the objective as long as it is sufficient to identify the highest solution achievable by this method.

In step 620, the number of beams below the elevation line is calculated, with the objective of identifying the highest elevation that allows $N_p$ beams to be searched.

An acquisition face consists of an odd number of beam rows with either m or m+1 beams in the outer row, and an odd number of beams in the center row. The rows are indicated by an index k ranging from 0 (the lowest row) to 2n where n is from the equation for N above. The index of the row containing the elevation origin is denoted by k=c. The specific beam in a given row is indicated by an index i=p. Index j also denotes a specific beam row as measured from the row containing the elevation line origin, thus ranges from −c to 2n−c.

For any given origin, the number of beams to the right of the origin is:

$$d = \left\{ \begin{array}{c} m+1 \\ m \end{array} \right\} - p$$

depending upon the number of beams in row c. Calculate $n_{j\beta}$ for all j using the table below, with $b=(B/2)\sin(\gamma)$ and recalling that δ is negative. For all j≥0 such that jΔE≥0, the number of excluded beams in each row k is:

$$\alpha_k = d + n_{j\beta}.$$

This number has a minimum of zero and a maximum value equal to the number of beams in the row, for example if $n_{j\beta}$ greater than m−d for a row of length m then $\alpha_k$=m. Below k=c the index j is negative, but is treated as even if |j| is even and odd otherwise. For k=0 through co−1 the number of excluded beams in each row is found as follows:

If the origin is on a row of length m then:

$$\alpha_k = \begin{cases} d - (1 + n_{j\beta}) & \text{if row } j \text{ has } m+1 \text{ beams} \\ d - 1 - (1 + n_{j\beta}) & \text{if row } j \text{ has } m \text{ beams} \end{cases}$$

If the origin is in a row of length m+1 then:

$$\alpha_k = \begin{cases} d - 1 - (1 + n_{j\beta}) & \text{if row } j \text{ has } m+1 \text{ beams} \\ d - (1 + n_{j\beta}) & \text{if row } j \text{ has } m \text{ beams} \end{cases}$$

Then the criteria for an elevation delimiting a searchable volume is that:

$$M = \sum_{k=0}^{2n} \alpha_k \geq N_p.$$

|  | m + 1, α ≥ π/6 | m + 1, α < π/6 | m, α ≥ π/6 | m, α < π/6 |
|---|---|---|---|---|
| $h_{j\beta}$ | β(jΔE − b) | β(jΔE − B) | β(jΔE − b) | β(jΔE − B) |
| $v_{j\beta}$ odd j | $\left\lfloor \dfrac{h_{j\beta}}{2\Delta A} \right\rfloor$ | $\left\lfloor \dfrac{h_{j\beta} - \Delta A}{2\Delta A} \right\rfloor$ | $v_{j\beta} = \left\lfloor \dfrac{h_{j\beta}}{2\Delta A} \right\rfloor$ | $v_{j\beta} = \left\lfloor \dfrac{h_{j\beta}}{2\Delta A} \right\rfloor$ |
| $n_{j\beta}$ odd j | $|v_{j\beta}| - 1$ | $|v_{j\beta}| - 1$ | $|v_{j\beta}|$ | $|v_{j\beta}|$ |
| $v_{j\beta}$ even j | $\left\lfloor \dfrac{h_{j\beta} - \Delta A}{2\Delta A} \right\rfloor$ | $v_{j\beta} = \left\lfloor \dfrac{h_{j\beta}}{2\Delta A} \right\rfloor$ | $\left\lfloor \dfrac{h_{j\beta} - \Delta A}{2\Delta A} \right\rfloor$ | $\left\lfloor \dfrac{h_{j\beta} - \Delta A}{2\Delta A} \right\rfloor$ |
| $n_{j\beta}$ even j | $|v_{j\beta}| - 1$ | $|v_{j\beta}|$ | $|v_{j\beta}| - 1$ | $|v_{j\beta}|$ |

In step 630, the coordinates of the origin determined in block 610 are saved if the number of beams M calculated in block 620 is less than or equal to Np, and if the elevation is greater than the number of beams calculated using the currently saved origin coordinates.

Blocks 610 through 630 are repeated in block 640 until the highest or maximum elevation $E_{max}$ is found that satisfies the condition: the number of beams M less than or equal to Np.

At step 650, find the partitioned acquisition face extents and centers are determined. For the negative β condition considered here the azimuth extent $A_{ext1}$ is αΔA if there are m beams in the outer row, where α is the number of beams in row k=0 row minus $α_0$. If there are m+1 beams then $A_{ext1}$=(α−1) ΔA. The new azimuth center is found relative to the center of the unpartitioned acquisition face, and is $A_{ext}-A_{ext1}$ where $A_{ext}$ is the unpartitioned azimuth extent. The displacement is always to the left of the unpartitioned center. For elevation, $E_{ext}$ may be estimated by |αΔA/β|. The center is also the difference in extents, adjusted downwards from the unpartitioned elevation center. Elevation and azimuth center are then rotated to their correct position about the center of the unpartitioned acquisition face prior to sending to the radar using:

$$\begin{pmatrix} A_{10} \\ E_{10} \end{pmatrix} = \begin{pmatrix} \cos(\alpha) & \sin(\alpha) \\ -\sin(\alpha) & \cos(\alpha) \end{pmatrix} \begin{pmatrix} -(A_{ext} - A_{ext1}) \\ -(E_{ext} - E_{ext1}) \end{pmatrix}$$

where α is negative for this example.

At step 660, the highest elevation for the partition, $E_{max}$, is stored for later use in the calculation of a subsequent partition, if additional partitioning is required (i.e., the entire volume has not been searched).

Figure 7:
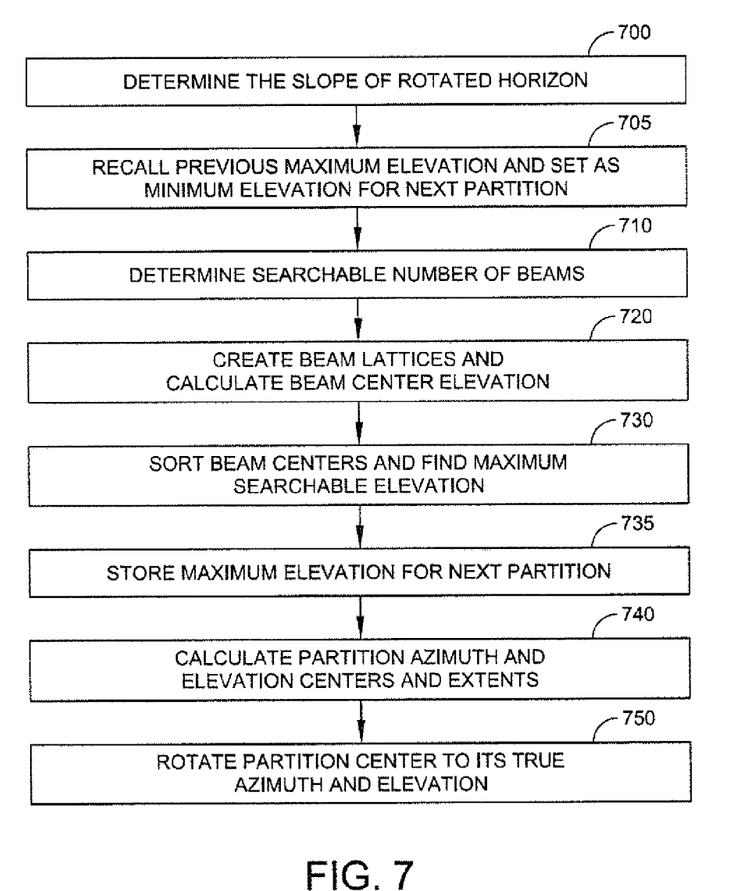
FIG. 7 is a flowchart illustrating the steps for another method of partitioning the acquisition face of a search volume, at block 530 of FIG. 5.

FIG. 7 is a flow chart of another exemplary method for partitioning an acquisition volume in true elevation. The method of FIG. 7 is representative of the type of processing performed in step 530 of the flowchart of FIG. 5. At step 700, the slope of the rotated elevation line is determined. A detailed description of determining the slope of the rotated elevation line is provided in relation to step 605 of FIG. 6. At step 705, the minimum elevation of the volume is replaced with the maximum elevation of the previously determined partition volume, so that the next partition starts where the previous partition ended. This step applies only where a previous partition has been calculated.

At step 710, the maximum number of beams, $N_p$, that can be searched in an allotted search time, $T_{search}$, is determined. As discussed in relation to blocks 516 through 520 of FIG. 5, the search time per beam, $T_{acq\_per}$, is range dependent, as is known in the art. The search time per beam is estimated using the range of the search volume as determined in block 518 of FIG. 5, and then the search time per beam, $T_{acq\_per}$, is estimated based on that range. Once the search time per beam is estimated, the maximum number of beams, $N_p$, that can be searched in an allotted search time, $T_{search}$, is the highest integer less than $N*(T_{acq\_per}/T_{search})$.

At step 720, a beam lattice is created that represents a pattern of radar beams on the acquisition face and the distance of the beam centers from a reference line are calculated. The calculation of the corresponding distance of each beam center is the distance d of each beam center from a (reference) line of slope tan(−α) where α is the rotation angle (i.e. the rotation angle required to restore the rotated covariance to its initial orientation). Distance is measured in degrees, and from this reference is a measure of the relative elevation which is easily transformed into true ENU elevation.

Specifically, in an embodiment, an acquisition face with the current exemplary radar beam pattern may be represented as the overlay of two rectilinear lattices of beam centers. A lattice L1 may consist of beams in rows of length m+1 and the other lattice L2 may consist of beams in rows of length m. The number of rows in L1 and L2 depends upon whether n and m are even or odd. The dependency is illustrated in Table below:

| n | m | L1 rows | L1 columns | L2 rows | L2 columns |
|---|---|---|---|---|---|
| odd | odd | n + 1 | m + 1 | n | M |
| odd | even | N | m + 1 | n + 1 | M |
| even | odd | N | m + 1 | n + 1 | M |
| even | even | n + 1 | m + 1 | n | M |

The total number of lattice points in L1 is $P_1$=(L1 columns)×(L1 rows) and the total number of lattice points in $P_2$=(L2 columns)×(L2 rows). The data to be generated for the beams may be stored in an array A of $P_1+P_2$ rows with each row containing data for a specific beam, and three columns representing x and y position relative to the lower leftmost beam center of L1, and a distance measure. The positions assignments of the elements of A for j between 1 and $P_1$ are:

$$x(j) = \text{floor}((j-1)/L1 \text{ rows}) \cdot \delta x$$

$$y(j) = res_j \cdot \delta y$$

where floor is the highest integer less than the argument, and $res_j$ is the residue of the congruence $(j-1) \equiv res_j \cdot \text{mod}(L1 \text{ rows})$. The quantities $\delta y$ and $\delta x$ are $2\Delta E$ and $2\Delta A$ respectively. The corresponding distance is measured from the line $y=\beta x$ (passing through the origin) and is:

$$d(j) = \frac{|-\beta x(j) + y(j)|}{\sqrt{1+\beta^2}} \quad (1)$$

From $P_1+1$ to $P_1+P_2$ a term $\Delta A$ is added to each x(j), and $\pm \Delta E$ to y(j) depending on whether m+n is even (+) or odd (−).

The distance of the unpartitioned array center $d_{center}$ is the middle lattice point of either L1 or L2 depending upon the parity of m. Since distance is in degrees throughout, the true elevation of the center of the unpartitioned volume $E_{center}$−$d_{center}$ is the true minimum elevation $\epsilon_{min}$ which is calculated and stored for the first partition.

The origin of the L1 coordinate system is slightly displaced from the lower corner of the unpartitioned acquisition volume. The components of displacement are:

$$\epsilon_x = m \cdot \Delta A - A_{ext}$$

$$\varepsilon_y = \begin{cases} n \cdot \Delta E - E_{ext}, \text{parity of } m = \text{parity of } n \\ (n-1) \cdot \Delta E - E_{ext}, \text{parity of } m \neq \text{parity of } n \end{cases}$$

The reference line passes through ($\epsilon_x$, $\epsilon_y$) and consequently has the form $y=\beta(x-\epsilon_x)+\epsilon_y$. Then to each d(j) in equation (1) above, or to those selected distances used elsewhere, we would add:

$$\varepsilon = \frac{|\varepsilon_y - \beta \varepsilon_x|}{\sqrt{1+\beta^2}}$$

At step 730, the beam centers are sorted by distance to find the maximum searchable elevation. If the maximum number of beams that can be used in the acquisition period is $N_p<N$, then the $N_p{}^{th}$ element of the sorted array is identified as containing the maximum true elevation bounding the partition. Specifically, the vectors (x, y, d) are sorted by increasing d and the elevation of the $N_p{}^{th}$ vector in the list is the maximum searchable elevation. However, if higher indexed lattice points have the same distance as the $N_p{}^{th}$ point, then the elevation associated with the next lower distance value in the array is identified as containing the maximum true elevation, which ensures that all beams at or below the limiting elevation can be searched.

At step 735, the highest elevation for the partition, $E_{max}$, is stored for later use in the calculation of a subsequent partition, if additional partitioning is required (i.e., the entire volume has not been searched).

At step 740, the azimuth and elevation centers and extents are calculated for the current ($k^{th}$) partition. $E_{max}$ and $E_{min}$, $A_{max}$ and $A_{min}$ are the upper and lower pseudo-elevation and azimuth of the unpartitioned volume, and $x_p$ and $y_p$ are the pseudo-azimuth and elevation of the $N_p{}^{th}$ lattice point, where the term "pseudo" denotes that the pseudo-elevation and pseudo-azimuth are measurements made in rotated space rather than in the "true" non-rotated space of the original covariances. The maximum and minimum elevation limits are then:

$$E_{min(k=0)} = E_{min}$$

$$E_{max\_new} = E_{min} + \min(2 \cdot E_{ext}, (y_p - \varepsilon_y) + \beta(\varepsilon_x - x_p)),$$

$$E_{min\_new} = \max[E_{min}, E_{min(k)}],$$

$$E_{min(k)} = E_{min} + \max[0, (y_p - \varepsilon_y) + \beta(2 \cdot A_{ext} - (x_p - \varepsilon_x))],$$

The value $E_{min(k)}$ is retained for the next partition.

Next, the pseudo-azimuth at the intercept of the maximum elevation line with the maximum pseudo-elevation is calculated. For the current partition:

$$A_{min(k=0)} = A_{min}$$

$$A_{min(k>0)} = A_{min} + \max[0, \beta^{-1}[2E_{ext} - (y_p - \varepsilon_y)] + (x_p - \varepsilon_x)]$$

This is retained as $A_{min(k)}$ for the next partition, along with the maximum elevation line slope and intercept. Then for the current partition, $$A_{max\_new} = A_{min} + \min[2 \cdot A_{ext}, (x_p - \varepsilon_x) - \beta^{-1}(y_p - \varepsilon_y)],$$

$$A_{min\_new} = A_{min(k-1)}$$

The center of the partitioned acquisition face must be found and repositioned to be the center of rotation of the partition. The radar will then rotate any contained beam center about this point to find its true elevation and azimuth. In pseudo-elevation/azimuth coordinates the elevation and azimuth centers and extents are:

$$E_{c0k} = \frac{1}{2}(E_{min\_new} + E_{max\_new}),$$

$$E_{extk} = \frac{1}{2}(E_{max\_new} - E_{min\_new}),$$

$$A_{c0k} = \frac{1}{2}(A_{min\_new} + A_{max\_new}),$$

$$A_{extk} = \frac{1}{2}(A_{max\_new} - A_{min\_new})$$

The center of the unpartitioned acquisition face is at $(E_c, A_c)$. At this point, if the original sign of $\beta > 0$ then $A_{c0k} \rightarrow A_{max} - A_{c0k}$. Then the vector from the unpartitioned volume center to the center of the current partition is:

$$\begin{pmatrix} A_{e1k} \\ E_{e1k} \end{pmatrix} = \begin{pmatrix} A_{c0k} - A_c \\ E_{c0k} - E_c \end{pmatrix}$$

At step 750, the true elevation and azimuth of the partition are calculated. To find the true elevation and azimuth of the partition center, the vector $$\begin{pmatrix} A_{e1k} \\ E_{c1k} \end{pmatrix} = \begin{pmatrix} A_{c0k} - A_c \\ E_{c0k} - E_c \end{pmatrix}$$

must be rotated through $\alpha$:, which was defined earlier as the angle the original covariance was rotated to align the covariance with one of the principal axes of the viewplane.

$$\begin{pmatrix} A_{c2k} \\ E_{c2k} \end{pmatrix} = \begin{pmatrix} \cos(\alpha) & -\sin(\alpha) \\ \sin(\alpha) & \cos(\alpha) \end{pmatrix} \begin{pmatrix} A_{c1k} \\ E_{c1k} \end{pmatrix}.$$

The position of the partition center in true elevation and azimuth is then:

$$\begin{pmatrix} A_{ck} \\ E_{ck} \end{pmatrix} = \begin{pmatrix} A_c + A_{e2k} \\ E_c + E_{c2k} \end{pmatrix}.$$

The disclosed method described herein may be automated by, for example, tangibly embodying a program of instructions upon a computer readable storage media capable of being read by machine capable of executing the instructions. A general purpose computer is one example of such a machine. One or more processors may execute the instructions to perform part or all of the disclosed method. A non-limiting exemplary list of appropriate storage media well known in the art would include such devices as a readable or writeable CD, flash memory chips (e.g., thumb drives), various magnetic storage media, and the like.

The features of the method have been disclosed, and further variations will be apparent to persons skilled in the art. All such variations are considered to be within the scope of the appended claims. Reference should be made to the appended claims, rather than the foregoing specification, as indicating the true scope of the disclosed method.

The functions and process steps herein may be performed automatically or wholly or partially in response to user command. An activity (including a step) performed automatically is performed in response to executable instruction or device operation without user direct initiation of the activity.

The systems and processes of FIGS. 1-7 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The processes and applications may, in alternative embodiments, be located on one or more (e.g., distributed) processing devices accessing a network linking the elements of FIG. 1. Further, any of the functions and steps provided in FIGS. 5-7 may be implemented in hardware, software or a combination of both and may reside on one or more processing devices located at any location of a network linking the elements of FIG. 1 or another linked network, including the Internet.

Furthermore, although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

The invention claimed is:

1. A method for searching a radar acquisition volume, comprising:
   receiving, by a communications unit, the radar acquisition volume;
   identifying, by a command and decision unit, an acquisition face of the acquisition volume;
   rotating the acquisition face by a rotation angle;
   partitioning, by the command and decision unit, the rotated acquisition face by:
      determining a maximum number of beams that can be searched in a predetermined time period;
      selecting an elevation line of the rotated acquisition face;
      determining a first number of radar beams that can be placed on the rotated acquisition face under the selected elevation line;
      comparing the first number of radar beams to the maximum number of radar beams;
      iteratively repositioning the selected elevation line to identify a highest elevation line for which the first number of radar beams is less than or equal to the maximum number of beams;
      wherein an area of the rotated acquisition face bounded by the highest elevation line defines a partitioned portion; and
   generating, by a radar beam controller, a search of each partitioned portion.

2. The method of claim 1, wherein rotating the acquisition face by a rotation angle comprises rotating the acquisition face so that an axis of the acquisition face is aligned with an axis of a viewplane.

3. The method of claim 1, wherein partitioning the rotated acquisition face comprises partitioning the rotated acquisition face into partitioned portions in which each partitioned portion is searchable within a predetermined time period.

4. The method of claim 1, further comprising identifying a next partitioned portion if the highest elevation line is below the maximum elevation of the rotated acquisition face.

5. The method of claim 4, further comprising setting the highest elevation line of the partitioned portion as the minimum elevation line of the next partitioned portion.

6. A method for searching a radar acquisition volume, comprising:
   receiving, by a communications unit, the radar acquisition volume;
   identifying, by a command and decision unit, an acquisition face of the acquisition volume;
   rotating the acquisition face by a rotation angle;

15 partitioning, by the command and decision unit, the rotated acquisition face by:
   determining a maximum number of beams that can be searched in a predetermined time period;
   defining a beam lattice for the rotated acquisition face;
   calculating beam center elevations for each beam in the beam lattice; and
   identifying, based on the beam center elevations, a maximum elevation line that uses a number of beams less than or equal to the maximum number of beams that can be searched in the predetermined time period,
   wherein an area of the rotated acquisition face bounded by the maximum elevation line defines a partitioned portion; and
   generating, by a radar beam controller, a search of each partitioned portion.

7. The method of claim 6, wherein partitioning the rotated acquisition face further comprises:
   determining a maximum and minimum elevation of the partitioned portion;
   determining an elevation and azimuth extent of the partitioned portion; and
   determining center coordinates of the partitioned portion.

8. The method of claim 6, further comprising determining a next partitioned portion if the highest elevation line is below the maximum elevation of the rotated acquisition face.

9. The method of claim 8, further comprising setting the highest elevation line of the partitioned portion as the minimum elevation line of the rotated acquisition face before determining the next partitioned portion.

10. The method of claim 6, wherein calculating beam center elevations for each beam comprises determining the distance of each beam center from a line sloped at the rotation angle.

11. The method of claim 6,
   wherein $N_p$ is the maximum number of beams that can be searched in a predetermined time period; and
   wherein determining, based on the beam center elevations, a maximum elevation line comprises:
   sorting the beam center elevations; and
   identifying the elevation line associated with $N_p$th element of the sorted beam center elevations as the maximum elevation line.

12. A radar system for searching a radar acquisition volume comprising:
   a command and decision unit configured to:
      identify an acquisition face of the acquisition volume;
      rotate the acquisition face by a rotation angle; and
      partition the rotated acquisition face into partitioned portions in which each partitioned portion is searchable within a predetermined time period by:
         determining a maximum number of beams that can be searched in the predetermined time period;
         selecting an elevation line of the rotated acquisition face;
         determining a first number of radar beams that can be placed on the rotated acquisition face under the selected elevation line;
         comparing the first number of radar beams to the maximum number of radar beams; and
         iteratively repositioning the selected elevation line to identify a highest elevation line for which the first number of radar beams is less than or equal to the maximum number of beams;
      wherein an area of the rotated acquisition face bounded by the highest elevation line defines the partitioned portion;

16 and
   a radar beam controller configured to generate a search of each partitioned portion.

13. The radar system of claim 12, wherein the command and decision unit being configured to rotate the acquisition face comprises the command and decision unit being configured to rotate the acquisition face so that an axis of the acquisition face is aligned with an axis of a viewplane.

14. The radar system of claim 12, further comprising a communications unit configured to receive the radar acquisition volume.

15. The radar system of claim 12, wherein the command and decision unit is further configured to determine a next partitioned portion if the highest elevation line is below the maximum elevation of the rotated acquisition face.

16. The radar system of claim 12, wherein the command and decision unit is further configured to set the highest elevation line of the partitioned portion as the minimum elevation line of the rotated acquisition face before determining the next partitioned portion.

17. A radar system for searching a radar acquisition volume comprising:
   a command and decision unit configured to:
      identify an acquisition face of the acquisition volume;
      rotate the acquisition face by a rotation angle; and
      partition the rotated acquisition face into partitioned portions in which each partitioned portion is searchable within a predetermined time period by:
         determining a maximum number of beams that can be searched in the predetermined time period;
         defining a beam lattice for the rotated acquisition face;
         calculating beam center elevations for each beam in the beam lattice; and
         identifying, based on the beam center elevations, a maximum elevation line that uses a number of beams less than or equal to the maximum number of beams that can be searched in a predetermined time period,
      wherein an area of the rotated acquisition face bounded by the maximum elevation line defines the partitioned portion;
   and
   a radar beam controller configured to generate a search of each partitioned portion.

18. The radar system of claim 17, wherein the command and decision unit being configured to partition the rotated acquisition face further comprises the command and decision unit being configured to:
   determine a maximum and minimum elevation of the partitioned portion;
   determine an elevation and azimuth extent of the partitioned portion; and
   determine center coordinates of the partitioned portion.

19. The radar system of claim 17, wherein the command and decision unit is further configured to:
   determine a next partitioned portion if the highest elevation line is below the maximum elevation of the rotated acquisition face; and
   set the highest elevation line of the partitioned portion as the minimum elevation line of the rotated acquisition face before determining the next partitioned portion.

20. The radar system of claim 17, wherein $N_p$ is the maximum number of beams that can be searched in a predetermined time period; and
   wherein the command and decision unit being configured to identify, based on the beam center elevations, a maximum elevation line comprises the command and decision unit being configured to:
sort the beam center elevations; and
identify the elevation line associated with $N_p$th element of the sorted beam center elevations as the maximum elevation line.

* * * * *